United States Patent Office 3,326,762
Patented June 20, 1967

3,326,762
NAIL STRENGTHENER CONTAINING S-CAR-
BOXY - METHYL - CYSTEINE AND SALTS
THEREOF
Maurice Joullie, Saint-Germain-en-Laye, Michel Laurre,
Chatillon-sous-Bagneux, and Gabriel Maillard and
Pierre Muller, Paris, France, assignors to Recherches
Pharmaceutiques et Scientifiques, Paris, France, a company of France
No Drawing. Filed June 26, 1964, Ser. No. 378,437
Claims priority, application France, Dec. 2, 1963,
955,739
10 Claims. (Cl. 167—85)

The present invention relates generally to a topical drug preparation and more particularly to a topical therapeutic composition containing a cysteine derivative in a form suitable for application to and ready absorption by the nails of living animals, including humans, to improve the condition of the nails.

Heretofore it has been suggested that amino acids, such as the sulfhydril amino acid, cysteine, play an important part in the phenomena of keratinization, a process which is involved in finger nail growth. However, the oral administration of an amino acid material, such as gelatin or other proteins or of cysteine specifically, has been of little value in correcting disorders of the nails, and particularly with regards to correcting ungual fragility.

It is therefore an object of the present invention to provide an improved topical therapeutic composition for correcting disorders of the nails.

It is another object of the present invention to provide an improved topical therapeutic composition for correcting ungual fragility.

It is a further object of the present invention to provide an improved topical therapeutic composition for application to nails containing a cysteine derivative which is readily absorbed through the nails.

It is a still further object of the present invention to prove a topical therapeutic composition containing a cysteine derivative which when massaged into the nail matrix unquis is readily assimilated thereby to effect a marked improvement in the condition of the nails.

It is also an object of the present invention to provide an improved method of treating the nails of humans to improve the condition of the nails.

It is another object of the present invention to provide an improved method of treating the nails of humans to correct ungual fragility.

It has now been discovered that the foregoing objects of the present invention can be achieved and a marked improvement in the condition of the finger nails and the nails of other living animals effected by applying topically to the nail a therapeutic composition comprising a cysteine derivative in association with ingredients providing a composition which can be conveniently applied to the nails and which permits ready absorption of the active ingredient through the matrix unquis or root of the nail.

More particularly, the present invention comprises a topical therapeutic composition which preferably employs as an essential ingredient thereof a water soluble form of the cysteine derivative, S-carboxy-methyl cysteine which has the following formula:

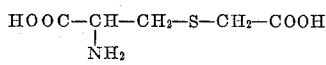

in a novel topical preparation which preferably has associated therewith ingredients which cooperate with the cysteine derivative to promote absorption through the root of the nail and improve the nail structure when a small quantity of the topical preparation is massaged or otherwise caused to penetrate into the root of the nail.

Because of its stability in an aqueous solution and its unusual topical activity, S-carboxy-methyl cysteine has been found to be particularly capable of exerting trophic action on the nail itself when applied locally on the root of the nail where the cell growth of the nail takes place.

S-carboxy-methyl cysteine occurs as a white powder, soluble in boiling water, insoluble in cold water and insoluble in the usual organic solvents. It reacts positively to ninhydrin and gives a dark blue copper salt, a white mercury salt insoluble in water and a negative reaction to nitroprusside.

The instantaneous melting point of S-carboxy-methyl cysteine is 249–250° C. (with decomposition). The results of analysis are as follows: Estimation of carbon and hydrogen by microdosage according to Zimmermann's method modified by Levy on a specimen of 3 to 5 mg.:

Theory: C=33.51%; H=5.06%. Found: C=33.45–33.67%; H=5.06–5.24%. Estimation of nitrogen by Dumas' method (Kjeldahl's method gives unsatisfactory results):

Theory: N=7.80%. Found: N=7.62–7.67%. Estimation of sulfur according to Zimmermann-Burger's method:

Theory: S=17.89%. Found: S=17.95–17.86%.

S-carboxy-methyl cysteine may be prepared by alkylating cysteine by means of an alkaline monochloracetate in the presence of a proton acceptor, for instance as follows:

In a four-necked flask fitted with a stirrer, a thermometer, a dropping funnel and a nitrogen supply tube, 1 mole gram of cysteine hydrochloride (anhydrous or hydrated) is introduced and diluted by addition of 515 ml. of water.

The solution is cooled to a temperature between 0 to +5° C., nitrogen is bubbled through and 2 moles of sodium hydroxide as a 5 N solution are introduced, the temperature being maintained between 0 and +5° C. The time required for introduction varies with the cooling means used. It lasts approximately 30 minutes when the flask is immersed in a mixture of ice and sodium chloride.

When all the sodium hydroxide has been introduced, the temperature being maintained between 0 and +5° C., 1.025 mole of sodium monochloracetate dissolved in 400 ml. water is introduced, with stirring under nitrogen.

The introduction takes from one to two hours.

When introduction is finished, the reaction mixture is heated to 50° C. and maintained at that temperature until the reaction of the SH function to sodium nitroprusside becomes negative (generally after 15 to 30 minutes at 50° C.). During this phase of the reaction, the pH should be checked from time to time. It should remain at 8 and if necessary be kept there by adding 5 N sodium hydroxide.

When the reaction to nitroprusside has become negative, the introduction of nitrogen is stopped and the pH is brought to about 6 by adding concentrated hydrochloric acid.

The reaction mixture is stirred for 5 minutes with 5 g. of active charcoal, the charcoal is then filtered off and the colorless solution is cooled to room temperature.

To precipitate S-carboxy-methyl cysteine, concentrated hydrochloric acid is added until the pH reaches 2.8 (approximately 1 mole).

The crystalline precipitate is centrifuged and washed on filter until there are no more chlorine ions in the filtrate.

The precipitate may be purified as follows: Impure S-carboxy-methyl cysteine is placed in suspension in 2 N hydrochloric acid (25% excess of HCl), boiled for five minutes and cooled to 30° C., then 2 N sodium hydroxide is added slowly, while stirring, until a pH of 2.8 is obtained. The product is washed in water until there are no more chlorine ions.

Acidimetric titration of the purified products gives a purity above 99.5%. The product is then air-dried—Yield=90 to 95%. The principal pharmacological properties of S-carboxy-methyl cysteine are as follows:

The toxicity is very low; acute toxicity in mice (intravenous administration: 10% aqueous solution, pH 7) gives an LD 50 of 3.1 g./kg.; the very low toxicity has made it impossible to determine the LD 50 for intraperitoneal, subcutaneous and oral administration in mice, or for intraperitoneal administration in rats, guinea pigs and rabbits.

Study of subacute intoxication in rats (daily dose: 0.200 g./kg. during 21 days; weekly hematological check-up, macroscopic and histological examinations of the viscera after three weeks) revealed no untoward signs and especially:

No abnormality in the behaviour and growth curve of rats and mice which received every day 0.075 g./kg. of S-carboxy-methyl cysteine in 10% aqueous solution, pH 7 (intraperitoneal administration in rats, intragastric administration in mice) during seven weeks and no alteration found by histological examination of the viscera in comparison with the controls;

No abnormality found in the anatomo-pathological examination of a fragment of animal skin after daily application (for 15 days, on a 1 cm. by 1 cm. square area of skin corresponding to the fragment) of an ointment identical to that described hereunder in Example No. 1.

S-carboxy-methyl cysteine administered intravenously in doses of 10 mg./kg. is without effect in rabbits on carotid blood pressure; in a dose ten times greater, there is a marked hypertension but there is no action on hypotension induced by acetylcholine or on the hypertension determined by obstruction of the carotids.

The compound does not have any marked effect on rat duodenum and causes effective relaxation only in a dose of from $1.10^{-3}$ upwards. It does not modify the histaminic contraction of guinea pig ileum but has a marked contracting effect on the isolated ileum in a dose of $1.10^{-4}$.

A strong dose of S-carboxy-methyl cysteine (1/20 ml. of a 0.005% solution) must be used to obtain vaso-constriction in the isolated rabbit ear perfused with normal saline solution.

There are no anti-histaminic, anti-inflammatory, and anticholeretic effects.

The action on nail fragility has been established by experiments on humans, as explained hereafter.

With a view to making satisfactory topical therapeutic compositions containing S-carboxy-methyl cysteine, it has been found preferable to employ S-carboxy-methyl cysteine in the form of a derivative thereof which is definitely more soluble in water than the almost insoluble parent substance. For that purpose S-carboxy-methyl cysteine, which has two carboxy groups can be combined with a basic compound, preferably in such an amount that one of said carboxy group is neutralized, to form a salt. Suitable basic compounds are alkalies, such as sodium hydroxide, potassium hydroxide and ammonia, and organic bases such as colamine and triethanolamine, or basic aminoacids, such as arginine, lysine and glycine, can also be employed to form a salt (i.e., acid addition salt).

By way of example, in order to solubilize 25 g. of S-carboxy-methyl cysteine suspended in 500 ml. of water, 10 ml. of caustic soda (NaOH) having a specific gravity of 1.33 (36° Bé.) are mixed with water to form a normal aqueous solution of sodium hydroxide, and the latter solution is added in an amount sufficient to raise the pH of the aqueous S-carboxy-methyl cysteine suspension to pH 6; thereby forming the water-soluble salt, mono-sodium salt of S-carboxy-methyl cysteine. Where a monobasic organic base or basic aminoacid is added instead of an inorganic base, one mole thereof should be added for each mole of S-carboxy-methyl cysteine.

The aqueous solution of the S-carboxy-methyl cysteine salt thus produced is thereafter preferably dispersed or emulsified in a lipid medium or in another ointment-like base to form an unguent composition suitable for topical application. If desired, however, the cysteine derivative can be incorporated into any suitable aqueous or non-aqueous carrier for direct application to the nails.

At least one surfactant is preferably employed for the purpose of finely dispersing the aqueous solution through the lipid medium. Suitable surfactants are those having both lipophilic and hydrophilic groups, Tween 80 being typical; however other surfactants such as Tween 60, alkali metal lauryl sulfonates and triethanolamine stearate can also be employed.

The lipid medium can comprise components employed in cosmetology, in particular so-called "penetrating" excipients, i.e., excipients which are capable of enhancing penetration of a therapeutically active substance (in this case S-carboxy-methyl cysteine) into the nail root. Typical examples are glycerol monostearate, glycerol monopalmitate, lanoline, hydrogenated lanoline and perhydrosqualene. Other examples are propylene-glycol stearate, hydrogenated oils and esterified oils. Polyethylene-glycols, such as a Carbowax, can also be present in the lipid medium.

The hydrogenated oils above referred to are oils in which the ethylenic bonds as present in natural oils have been saturated with hydrogen. In commercial practice hydrogenation is effected at a superatmospheric pressure, at an elevated temperature, in the presence of catalysts. For example, oleic acid, an unsaturated fatty acid having 18 carbon atoms, is thus converted to stearic acid, the corresponding saturated fatty acid by hydrogenation.

By "esterified oils" we mean mixed esters obtainable by alcoolysis of natural vegetable oils in the presence of polyoxyethyleneglycol having a molecular weight of the range 200–400, i.e., mixed esters from glycerol and polyoxyethyleneglycol.

The preferred pharmaceutical form is a cream containing a 0.5 to 10% concentration of S-carboxy-methyl cysteine (in the form of the mono-sodium salt thereof) in a penetrating aqueous fatty excipient.

The following examples illustrate useful formulas:

Example No.:
(1) S-carboxy-methyl cysteine _____g__ 2
    Interesterified almond oil _____g__ 2
    Excipient q.s. for _____g__ 100
(2) S-carboxy-methyl cysteine _____g__ 2
    Cholesterol palmitate _____g__ 10
    Excipient q.s. for _____g__ 100
(3) S-carboxy-methyl cysteine _____g__ 2
    Cholesterol palmitate _____g__ 10
    Cholesterol _____g__ 2
    Excipient q.s. for _____g__ 100
(4) S-carboxy-methyl cysteine _____g__ 2
    Cholesterol palmitate _____g__ 10
    Cholesterol _____g__ 2
    Thyroxine _____g__ 0.02
    Excipient q.s. for _____g__ 100
(5) S-carboxy-methyl cysteine _____g__ 2
    Cholesterol palmitate _____g__ 10
    Cholesterol _____g__ 2
    Thyroxine _____g__ 0.02
    Vitamin A (palmitate) _____units__ 50,000
    Excipient q.s. for _____g__ 100

The excipient used in the foregoing examples is an emulsified excipient having the following composition (omitting the usual minor amounts of coloring agent and preserving agent, sufficient for the desired purpose):

|  | Percent |
|---|---|
| Glycerol monostearate | 10 to 15 |
| Hydrogenated lanolin | 13 to 15 |
| Sorbitol | 3 to 5 |
| Sorbitol polyoxyethylene mono-oleate (Tween 80) | 4 to 5 |
| Water q.s. for 100 g. | |

A red coloring agent is generally used. As a rule two coloring agents are associated: the first to color the aqueous phase (for instance Ponceau Brilliant 4 N or Coccine Nouvelle) and a second to color the oil phase (erythrosin for instance).

The preserving agent can be either a quaternary ammonium compound such as benzalkonium chloride, or another preserving agent such as sorbic acid. Mercury derivatives cannot be used because of their reaction with S-carboxy-methyl cysteine.

The general method for preparing products formulated as above is as follows:

(a) Dissolve S-carboxy-methyl cysteine in water at 50° C. and bring the solution to a pH of 6 by adding sodium hydroxide, then add sorbitol and Tween 80, then the coloring and preserving agents;

(b) melt the fatty components at approximately 50–60° C. to form an oil phase;

(c) add the aqueous phase to the oily phase with mechanical stirring continued until mixture is cold and a uniform dispersion or emulsion formed.

*Example 3a.—Formula*

| | G. |
|---|---|
| S-carboxy-methyl cysteine | 2 |
| Cholesterol palmitate | 10 |
| Cholesterol | 2 |
| Glycerol monostearate | 10 |
| Hydrogenated lanolin | 13 |
| Sorbitol | 5 |
| Tween 80 | 4 |
| Distilled water | 54 |
| Coloring Agents: | |
| Ponceau Brilliant 4 N | 0.025 |
| Erythrosin | 0.20 |

*Manufacture:*

(a) Aqueous phase: to 54 ml. of water at 50° C., add S-carboxy-methyl cysteine, stir, and add sodium hydroxide pellets until pH 6 is obtained. Then add sorbic acid (g) and stir until completely in solution. Add to the foregoing aqueous solution the sorbitol, erythrosin, Ponceau Brillant 4 N and then Tween 80, while mantaining a temperature of 50° C.;

(b) Oily phase: at 55–60° C. melt the glycerin monostearate and the hydrogenated lanolin, then add the cholesterol and cholesterol palmitate;

(c) Add the aqueous phase to the oily phase at about 50° C. and allow to cool with stirring to form a topical therapeutic unguent composition.

The above described preparations have been tested extensively clinically in the treatment of nail fragility, especially those described in Examples 3a and 5. For those two preparations, the posology and directions for use were absolutely identical: an amount of the composition corresponding to approximately 0.25 g. was deposited on the base of the finger nail every evening and the composition massaged into the matrix unguis.

A nail is made up of a compact variety of keratin called kard keratin. It is a known fact that this kard keratin which does not contain any fat matures without any stratum granulosum or keratohyalin.

Keratinization is the result of the transformation of the globular proteins of the malpighian cells into fibrous proteins. This transformation lies mostly in the oxidation of two molecules of cysteine (with a SH group) which results by dehydrogenation in a molecule of cystin (radicals linked by an S-S-disulfide bridge). Therefore the passage from SH to S-S- is critical in the process of keratinization. The part played by S-carboxy-methyl cysteine is important in this respect for the treatment of nail alterations by the drug described herein.

Nail fragility is extremely frequent among woman. It affects one woman out of three. The nails may be clevable (they may be split in two or form scales), they may be brittle (with splinters or fissures) or they may be soft.

Besides the esthetic damage resulting from broken nails, there is difficulty in all the daily housework.

The most frequent causes of such alterations are: the drying effect of certain nail-polish removers, the use of detergents and household chemicals, lesions due to excessively pushed back cuticle.

The general causes are discrete as a rule. Therefore we consider that the treatment liable to remedy such disorders should be local.

Applied once a day preferably by massage on the base of the injured nails, the preparation described herein supplies the S-carboxy-methyl cysteine required for the vitality and maintenance of nail keratin. The preparation should be contacted with the injured nails for a time period of the order of five minutes. While it is desirable to effect massage, the preparation may be applied without rubbing, for example by means of an absorbent pad moistened with the preparation or by immersion.

After eight days of this treatment, the surface of the nails, often granulated or spotted, becomes smoother and shinier. By the fifteenth day, the split or scaly nails become firmer, and particularly there is marked hardening of soft nails. The splinters or fissures which used to be produced spontaneously on the least contact, disappear.

The originality of this treatment lies in the fact that the reorganization of the nail structure is not obtained by the classical means for fixing the proteins and denaturating the same (as is the case with preparations containing formaldehyde) but by actually enriching the mitotic region of the nail with a sulfur-containing amino acid.

Finally, the drug described herein does not destroy nail polish, which thus may be used during treatment. It should also be noted that the drug does not determine any phenomenon of cutaneous sensitization or of irritation, even after extensive treatment.

It should be understood, of course, that the cysteine derivatives which are employed in the present invention are the cysteine derivatives which are non-toxic and devoid of untoward reactions when applied topically to the nails and when absorbed by the nails and adjacent skin areas of living animals, including humans. Also, the preferred cysteine derivatives are those which are stable in contact with water and which exhibit appreciable water solubility, since these derivatives can be incorporated into a topical composition more economically and are readily absorbed. Other cysteine derivatives which are stable and soluble in other non-toxic carriers can be used, so long as all of the essential requirements of a topically applicable therapeutic composition are also satisfied.

Others may practice the invention in any of the numerous ways which are suggested to one skilled in the art by this disclosure, and all such practices of invention are considered to be a part hereof which fall within the scope of the appended claims.

What we claim is:

1. A topical therapeutic composition for treating the nails of a living animal to improve the condition thereof which comprises: a non-toxic topically applicable unguent carrier having uniformly dispersed therethrough as the principal active ingredient for treating said nails a stable non-toxic substantially water-soluble salt of S-carboxy-methyl cysteine which is adapted to being absorbed by said nails, and said salt in an amount between about 0.5% and 10% by weight being uniformly dispersed in the aqueous phase of a water-in-oil emulsion forming said topically applicable unguent carrier.

2. A topical therapeutic composition which comprises: an aqueous solution of a stable non-toxic water-soluble salt of S-carboxy-methyl cysteine uniformly dispersed in a topically applicable lipid carrier.

3. A topical therapeutic composition which comprises: an aqueous solution of a stable non-toxic water-soluble S-carboxy-methyl cysteine salt uniformly dispersed in a topically applicable lipid carrier containing a dispersing surfactant to increase the rate of absorption of said salt by the nail of a living animal.

4. A topical therapeutic composition which comprises: an aqueous solution of a mono-sodium salt of S-carboxy-methyl-cysteine uniformly dispersed as the aqueous phase of a water-in-oil emulsion which forms a topically applicable carrier for said salt.

5. A topical therapeutic composition which comprises: an aqueous solution of a mono-sodium salt of S-carboxy-methyl-cysteine uniformly dispersed as the aqueous phase of a water-in-oil emulsion forming a topically applicable carrier and containing cholesterol palmitate, glycerin monostearate, hydrogenated lanolin, and cholesterol.

6. The topical therapeutic composition of claim 5, wherein the said S-carboxy-methyl cysteine salt comprises between about 0.5% and 10% by weight of said composition.

7. In a method of treating the nails of a living animal to improve the condition thereof, the step which comprises: applying to a nail of a living animal a topical therapeutic composition comprising a non-toxic topically applicable carrier having uniformly dispersed therethrough as the principal active ingredient for treating said nail a non-toxic salt of S-carboxy-methyl cysteine adapted to being absorbed by the nails of a living animal.

8. In a method of treating nails of a living animal to improve the condition thereof, the step which comprises: applying to a nail of a living animal a topical therapeutic composition comprising a non-toxic topically applicable lipid carrier having uniformly dispersed therethrough as the principal active ingredient for treating said nail an aqueous solution of a stable non-toxic water-soluble salt of S-carboxy-methyl cysteine adapted to being absorbed by the nails of a living animal.

9. A method of treating the nails of a living animal to improve the condition thereof which comprises, applying to a nail of a living animal a topical therapeutic composition containing as the principal active ingredient for treating said nail an aqueous solution of a stable non-toxic water-soluble S-carboxy-methyl-cysteine salt, and massaging said composition into the root of said nail to increase the rate of absorption of said composition by said nail.

10. A method of treating the nails of a living animal as in claim 9, wherein the said S-carboxy-methyl cysteine salt comprises between about 0.5% to 10% by weight of said composition.

References Cited
UNITED STATES PATENTS 3,107,252   10/1963   Lubowe _____ 167—58 X

OTHER REFERENCES

Schoberl et al.: Chem. Abstracts, 1957, vol. 51, p. 3455.

ALBERT T. MEYERS, *Primary Examiner.*

JULIAN S. LEVITT, *Examiner.*

DALE R. MAHANAND, *Assistant Examiner.*